United States Patent Office.

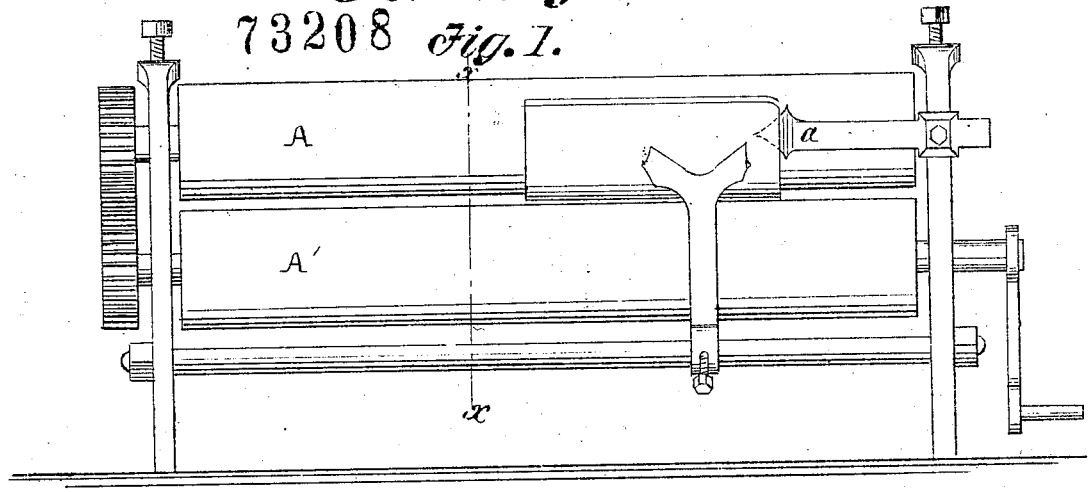
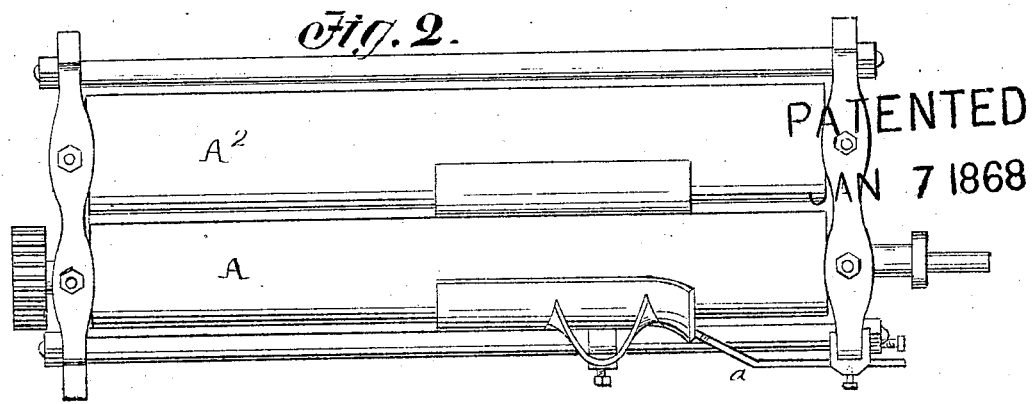
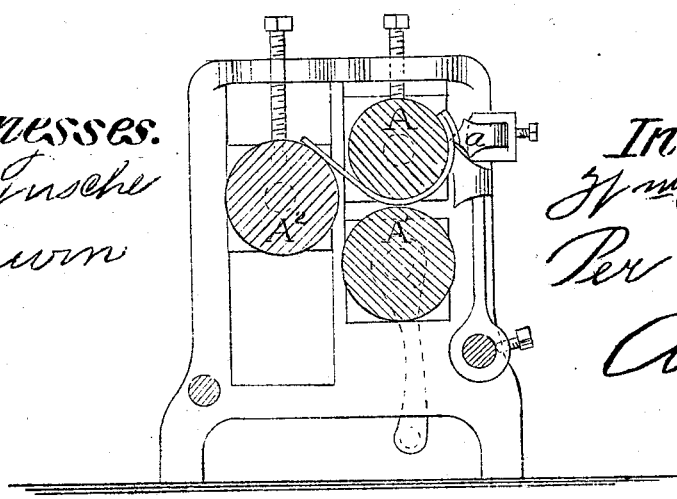

WILLIAM STINE, OF ELMORE, OHIO.

Letters Patent No. 73,208, dated January 7, 1868.

---

IMPROVEMENT IN TINNERS' FORMING-MACHINE.

---

The Schedule referred to in these Letters Patent and making part of the same.

---

TO ALL WHOM IT MAY CONCERN:

Be it known that I, WILLIAM STINE, of Elmore, in the county of Ottawa, and State of Ohio, have invented a new and useful Improvement in Tinman's Forming-Machine; and I do hereby declare that the following is a full, clear, and exact description thereof, which will enable those skilled in the art to make and use the same, reference being had to the accompanying drawings, forming part of this specification, in which—

Figure 1 represents a side elevation of a tinman's forming-machine.

Figure 2, a top view.

Figure 3, a cross-section in the line $x\ x$, fig. 1.

Similar letters of reference indicate corresponding parts.

This invention relates to an improvement in a tinman's forming-machine, and consists in a gauge attached thereto for flaring cylinders or tubes at one end, as hereinafter described.

The machine is constructed in the ordinary manner, with two rollers, $A\ A^1$, geared together, and operated by a crank and one-friction-roller, $A^2$. The machine as thus usually constructed to form cylinders and tubes by tinners, produces only straight work, or true straight-sided cylinders, and for the purpose of making cylinders with flaring edges, which for many purposes is necessary, I attach a gauge, $q$, to the machine, which is secured with a set-screw, to allow of changes in the size and shape of the gauge. This gauge has an inclined or taper side, extending to the two rollers $A\ A^1$, where they come in contact, and as the cylinder is formed on the rollers in the usual way, one end of the material is pressed against the gauge, which flares it outwardly, as represented in the drawing.

Having described my invention, I claim as new, and desire to secure by Letters Patent—

The flaring gauge $a$, in combination with the rollers of a tinman's forming-machine, arranged and operating substantially as and for the purpose herein described.

WILLIAM STINE.

Witnesses:
P. K. KEATZER,
N. C. LELAND.